United States Patent [19]
Robbins

[11] 3,875,297
[45] Apr. 1, 1975

[54] METHOD FOR MAKING FERROMAGNETIC CHROMIUM DIOXIDE

[75] Inventor: Harry Robbins, Los Angeles, Calif.

[73] Assignee: Eastman Kodak Co., Rochester, N.Y.

[22] Filed: July 18, 1973

[21] Appl. No.: 380,450

[52] U.S. Cl............................. 423/607, 252/62.51
[51] Int. Cl............................................. C01g 37/02
[58] Field of Search.................. 423/607; 252/62.51

[56] References Cited
UNITED STATES PATENTS

| | | | |
|---|---|---|---|
| 3,117,093 | 1/1964 | Arthur et al. | 423/607 X |
| 3,278,263 | 10/1966 | Cox | 423/607 |
| 3,493,338 | 2/1970 | Hicks et al. | 252/62.51 X |

Primary Examiner—Herbert T. Carter
Attorney, Agent, or Firm—D. M. Schmidt

[57] ABSTRACT

Ferromagnetic chromium dioxide is prepared by direct oxidation, under pressure, of chromium nitrate.

5 Claims, No Drawings

METHOD FOR MAKING FERROMAGNETIC CHROMIUM DIOXIDE

FIELD OF THE INVENTION

The field of art to which the invention pertains includes the field of magnetic compositions and preparations thereof, particularly with respect to ferromagnetic chromium dioxide.

BACKGROUND AND SUMMARY OF THE INVENTION

The ferromagnetic species of chromium oxide is of known and valuable use as a magnetizable material for recording tapes, and the like, and has been identified as chromium dioxide, a material having a tetragonal crystal structure. The dioxide form is invariably prepared from an oxide or hydroxide of chromium of a different valence state. When chromium trioxide is simply heated, it loses oxygen to form a plurality of lower oxides having the chemical analytical formula $Cr_xO_y$, in which x and y can have almost any integral value from 1 to quite large numbers. The reaction is difficult to control or stop at any definite stage and has no practical value for preparing the ferromagnetic dioxide species. In U.S. Pat. No. 2,956,955 to Arthur, Jr. a process is described for preparing the ferromagnetic species by the decomposition of hexavalent chromium, in the form of chromium trioxide, under hydrothermal conditions. By retaining liberated oxygen under pressure, the reaction procedes stepwise to yield well defined products in a reasonably pure state. Further developments have included the incorporation of various interstitial modifiers to alter magnetic properties of the crystalline material, such as the oxides of selenium, antimony and tellurium. See, for example, the Ingraham and Swaboda U.S. Pat. Nos. 3,034,988, 3,068,176 and 2,923,683, Oppegard U.S. Pat. No. 2,885,364, Ingraham U.S. Pat. No. 2,923,684, Swaboda U.S. Pat. No. 2,923,685, Bathis, Jr. U.S. Pat. No. 3,449,073, Kobota U.S. Pat. No. 3,243,260, Haines U.S. Pat. No. 3,574,115 and Miharo et al U.S. Pat. Nos. 3,547,823 and 3,547,824.

In addition to reduction reactions, ferromagnetic chromium dioxide has been prepared by oxidation of the trivalent chromium, in the form of chromium sesquioxide ($Cr_2O_3$), by inclusion of an oxidizing agent such as hydrogen peroxide, chromium trioxide or oxygen under pressure; see, for example, Cox U.S. Pat. No. 3,278,263. In the Cox patent, a chromium (III) oxide is first prepared by precipitation of the hydroxide, e.g. with ammonium hydroxide, from a solution of a soluble chromium (III) salt such as chromic chloride or chromic nitrate. Another procedure in which chromium nitrate is used is disclosed in Arthur and Ingraham U.S. Pat. No. 3,117,093. There, chromic nitrate nonahydrate is decomposed by heating at atmospheric pressure, to drive off water and oxides of nitrogen while oxidizing the chromium, to form a "starting" oxide product having a valence of 3 to an average valence above 4, usually between 4.1–5.0. The "starting" oxide is then thermally decomposed under pressure to form chromium dioxide. In the procedures of Cox and of Arthur-Ingraham, modifiers, as above, can be added without affecting the process parameters.

In each of the Cox and Arthur-Ingraham methods, use is made of chromic nitrate because of the ready availability of such material in relatively pure form. However, in each process the chromic nitrate is used only as a precursor to prepare a non-ferromagnetic chromium oxide "starting" material for a further processing step. Indeed, one would expect that by subjecting the nitrate to the pressure and decomposition conditions used in forming chromium dioxide, only a poorly defined contaminated product, if any, would be obtained.

The present invention provides a process for the direct utilization of chromic nitrate to form ferromagnetic chromium dioxide in one step. Specifically, it has been discovered that by subjecting chromic nitrate, preferably the nonahydrate, to oxygen under an initial pressure of above 500 psi, at a temperature of about 250°C to about 500°C, a direct conversion to chromium dioxide takes place. The mechanism for such conversion is not fully understood, but it is different from the decomposition and/or oxidation mechanisms of prior process since the presence of common modifiers such as the oxides of selenium, antimony and tellurium, inhibits the conversion. Accordingly, the present invention provides for the direct utilization of chromic nitrate in a one-step process to prepare ferromagnetic chromium dioxide, a process which is particularly useful in preparing unmodified chromium dioxide.

DETAILED DESCRIPTION

Ferromagnetic chromium dioxide is prepared in accordance with the present invention by heating chromic nitrate, preferably the hydrated form, $Cr[NO_3]_3\cdot 9H_2O$, at a temperature of about 250°C to about 500°C while under oxygen pressure of at least 500 psi. The chromic nitrate can be placed in a bomb which is then sealed and pressurized with oxygen to an initial pressure of above 500 psi (e.g. 500–5,000 psi). The bomb is then placed in a furnace, and heated to a temperature in the range of 250°C to about 500°C and maintained at that temperature range for a period of from a few minutes, e.g. 10 minutes, to a day or more.

During heating, the bomb pressure increases with temperature to up to about 20,000 or more psi pressure during reaction. For greater time-effectiveness, it is preferred to heat rapidly to a moderate temperature, e.g. up to about 310°C and then to more slowly increase the temperature until the desired final reaction pressure is achieved. Greater oxygen pressure can be used as can higher temperatures with shorter reaction times, provided that specially reinforced equipment is provided to ensure safety of operation. Longer reaction times can also be employed but are generally not necessary.

The reaction conditions are hydrothermal to the extent of the water of hydration of the chromic nitrate nonahydrate. Use of the hydrated salt is preferred and it is commonly available in its fully hydrated form. Although not necessary to assure reaction, additional water can be present, e.g. up to about 300 percent, by weight or higher.

As a further embodiment, if desired, one can admix other materials which are chromium dioxide precursors under the processing conditions; for example, one can add chromium sesquioxide ($Cr_2O_3$) in an amount constituting from 5–95 weight percent of the total mixture and thereby raise the coercivity of the product. The chromium sesquioxide can conveniently be prepared by carefully heating chromic nitrate nonahydrate, at atmospheric pressure, e.g. at 400°–500°C until the $NO_3^-$ moiety has been evaporated. One can also add other oxidants such as hydrogen peroxide or chromium trioxide or the like; e.g. see Cox U.S. Pat. No. 3,278,263, referred to above, and the disclosure thereof is hereby incorporated herein by reference.

The reasons for success of the present process are not fully understood and, in fact, the success is quite surprising in view of the expected contaminating effect of the $NO_3^-$ group in the confines of a sealed bomb. The novelty of the reaction mechanism is underscored by the fact, as above described, that such common modifiers as the oxides of selenium, antimony and tellurium prevent successful operation of the present process; yet such modifiers have no such adverse affect when incorporated in prior art processes.

The product obtained from the foregoing process consists of fine, acicular, black particles of ferromagnetic chromium dioxide having a tetragonal crystal structure of the rutile type, ranging up to two microns in length and having a median axial ratio of greater than 2:1. The following examples, in which the amounts of the ingredients are in parts by weight, will further illustrate the invention.

EXAMPLE 1

Twenty parts of chromic nitrate nonahydrate were placed in a bomb fitted with piping to admit oxygen under pressure and with a pressure gauge to indicate the amount of oxygen present. The bomb was sealed and sufficient oxygen was pumped into the bomb to obtain a pressure of 6,000 psi. The bomb was then placed in a furnace and the furnace was heated to 310°C, held at that temperature for about fifteen minutes and then slowly raised to obtain a pressure reading of 18,000 psi, which occured at a temperature of 410°C. The bomb was then cooled and the pressure released. Product obtained was washed several times with distilled water and dried in an oven at 100°-120°C. The product obtained was found to consist of fine, acicular, black particles of ferromagnetic chromium dioxide having a tetragonal crystal structure of the rutile type ranging up to 2 microns in length and having a coercivity of 65 Oersteds and a sigma of 65.7. The sigma value was measured in a field of 2,000 Oersteds using a BH meter at room temperature. Additionally, the product was found to have a ratio of residual induction to maximum induction ($B_r/B_m$) of 0.10.

EXAMPLE 2

Thirty parts of chromium sesquioxide (obtained by precipitation from chromic nitrate nonahydrate with ammonium hydroxide at 480°C) were mixed with 30 parts of chromic nitrate nonahydrate and the mixture was placed in the bomb of Example 1. The bomb was sealed and sufficient oxygen was pumped into the bomb to obtain a pressure of 5,000 psi. The bomb was heated in a furnace to 400°C, to obtain a pressure gauge reading of 17,000 psi, and maintained at that temperature for 2 hours. The product was obtained as in Example 1 and was found to be fine, acicular black particles of ferromagnetic chromium dioxide, of the type above described, having a coercivity of 260 Oersteds, a sigma of 48.2 and a $B_r/B_m$ ratio of 0.121.

EXAMPLE 3

The procedure of Example 1 was followed except that 0.5 part of antimony sesquioxide ($Sb_2O_3$) was mixed with 40 parts of chromic nitrate nonahydrate. The bomb was charged with 5,000 psi oxygen and heated to 400°C in 60 minutes, to a pressure gauge reading of 18,000 psi. Only low conversion to chromium dioxide was obtained, the bulk of the product being a gray powder which appeared to be anhydrous chromic nitrate.

EXAMPLE 4

The procedure of Example 1 was repeated except that 1 part of selenium dioxide ($SeO_2$) was added to 50 parts of chromic nitrate nonahydrate. The bomb was charged with 5,000 psi oxygen and heated to 310°C, held there for a few minutes and heated to 400°C, a total period of 90 minutes. A product similar to that of Example 3 was obtained.

EXAMPLE 5

The procedure of Example 1 was repeated except that 1 part of tellurium dioxide ($TeO_2$) was added to 50 parts of chromic nitrate nonahydrate. The bomb was charged with 6,000 psi oxygen and heated to 310°C in 30 minutes and then to 410°C over a total period of 2.5 hours, to a pressure gauge reading of 18,000 psi. A product similar to that of Example 3 was obtained.

The present process enables the production of ferromagnetic chromium dioxide with facility and economy. The product can be used as such in various known devices which incorporate ferromagnetic chromium dioxide, such as magnetic sound recording tapes, drums and records, memory devices, microwave circuitry, and magnetic cores such as coil cores in electronic equipment; see for example the above noted Arthur, Jr. U.S. Pat. No. 2,956,955, the disclosure of which is hereby incorporated herein by reference. Additionally, the product presently obtained can be mixed with other ferromagnetic chromium oxides having greater coercivities, or other particular magnetic properties, e.g., as obtained with prior processes using modifiers, to form customized blends having almost any desired magnetic property.

I claim:

1. A process for preparing ferromagnetic chromium oxide which comprises placing chromic nitrate in a closed vessel under an initial oxygen pressure of at least 500 p.s.i. and then heating said chromic nitrate and oxygen at a temperature of between about 250° and about 500°C for a time sufficient to increase said pressure and form upon separating and drying, ferromagnetic chromium dioxide as the resulting product.

2. The process of claim 1 in which said chromic nitrate is chromic nitrate nonahydrate.

3. The process of claim 1 including adding an oxide of trivalent chromium to said chromic nitrate to form a mixture thereof, said oxide constituting about 5–95 weight percent of said mixture.

4. The process of claim 3 in which said oxide is chromium sesquioxide.

5. The process of claim 1 in which said chromic nitrate is substantially free from modifiers of chromium dioxide.

* * * * *